United States Patent
Sjursen et al.

[19]

[11] Patent Number: 5,973,818
[45] Date of Patent: Oct. 26, 1999

[54] METHOD AND APPARATUS FOR CONTROLLING AN ELECTROCHROMIC DEVICE

[75] Inventors: Walter P. Sjursen, Washington Crossing; Christopher C. Gregory, Newtown, both of Pa.

[73] Assignee: PPG Industries Ohio, Inc., Cleveland, Ohio

[21] Appl. No.: 09/157,723

[22] Filed: Sep. 21, 1998

[51] Int. Cl.$^6$ .............................. G02F 1/15; G02F 1/153; G02F 1/163

[52] U.S. Cl. .................... 359/265; 359/267; 359/275; 351/44

[58] Field of Search .................... 359/265, 267, 359/275; 345/239, 105; 351/44, 45

[56] References Cited

U.S. PATENT DOCUMENTS

| | | | |
|---|---|---|---|
| 3,630,603 | 12/1971 | Letter | 351/44 |
| 3,972,040 | 7/1976 | Hilsum et al. | 340/324 M |
| 4,210,907 | 7/1980 | Hamada et al. | 340/785 |
| 4,219,809 | 8/1980 | Schwarzschild et al. | 340/785 |
| 4,298,870 | 11/1981 | Saegusa | 340/785 |
| 4,512,637 | 4/1985 | Ballmer | 350/357 |
| 4,529,275 | 7/1985 | Ballmer | 350/357 |
| 4,832,468 | 5/1989 | Ito et al. | 350/357 |
| 4,892,394 | 1/1990 | Bidabad | 350/357 |
| 5,365,365 | 11/1994 | Ripoche et al. | 359/267 |
| 5,402,144 | 3/1995 | Ripoche | 345/105 |
| 5,451,822 | 9/1995 | Bechtel et al. | 307/9.1 |
| 5,455,637 | 10/1995 | Kallman et al. | 351/44 |
| 5,455,638 | 10/1995 | Kallman et al. | 351/44 |
| 5,471,338 | 11/1995 | Yu et al. | 359/273 |
| 5,486,952 | 1/1996 | Nagao et al. | 359/603 |
| 5,552,841 | 9/1996 | Gallorini et al. | 351/49 |
| 5,581,406 | 12/1996 | Kobayashi et al. | 359/604 |
| 5,587,828 | 12/1996 | Bernard, Jr. | 359/275 |
| 5,604,626 | 2/1997 | Teowee et al. | 359/265 |
| 5,608,567 | 3/1997 | Grupp | 359/275 |
| 5,671,035 | 9/1997 | Barnes | 351/45 |

FOREIGN PATENT DOCUMENTS

WO 97/28484   8/1997   WIPO.

OTHER PUBLICATIONS

Copending U.S. application No. 09/157,724 entitled "Apparatus for Controlling an Electrochromic Device", filed Sept. 21, 1998, by Walter P. Sjursen.

U.S. application No. 09/157,725 entitled "Method and Apparatus for Controlling an Electrochromic Device", filed Sept. 21, 1998, by Timothy A. Pletcher, et al.

U.S. application No. 09/046,386 entitled "Method for Forming a Molded Edge Seal", filed Mar. 23, 1998, by John E. Smarto, et al.

*Primary Examiner*—Georgia Epps
*Assistant Examiner*—Margaret Burke
*Attorney, Agent, or Firm*—William C. Mitchell

[57] ABSTRACT

A method and concomitant apparatus for use in an electrochromic control system in which components causing the charging and discharging of an electrochromic device are subject to drift errors and other errors. In the case of such errors, the actual programming level and the desired programming level as indicated by, e.g., a count value, may diverge. The invention periodically determines the actual programming level of the electrochromic device and responsively adjusts a parameter representative of the desired programming level.

14 Claims, 3 Drawing Sheets

METHOD AND APPARATUS FOR CONTROLLING AN ELECTROCHROMIC DEVICE

This application is related to U.S. patent application Ser. No. 09/157,724 (Attorney Docket No. TC-97-087), filed on the same date as the present application.

The invention relates to the control of electrochromic devices, more particularly, the invention relates to error correction methodology and apparatus suitable for use in an electrochromic device control system.

BACKGROUND OF THE DISCLOSURE

The optical properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device utilizes reversible oxidation and reduction reactions to achieve optical switching.

Conventional electrochromic devices comprise at least one thin film of a persistent electrochromic material, i.e., a material which, in response to application of an electric field of given polarity, changes from a high-transmittance, non-absorbing state to a low-transmittance, absorbing or reflecting state. Since the degree of optical modulation is directly proportional to the current flow induced by the applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer. The electrochromic film(s) and ion-conductive material are disposed between two electrodes, forming a laminated cell.

When the electrode adjacent to the electrochromic film is the cathode, application of an electric field causes darkening of the film. Reversing the polarity causes electrochromic switching, and the film reverts to its high-transmittance state. Typically, an electrochromic film such as tungsten oxide is deposited on a substrate coated with an electroconductive film such as tin oxide or indium tin oxide to form one electrode. The counter electrode is typically a similar tin oxide or indium tin oxide coated substrate.

Since an electrochromic device may be modeled as a non-linear passive device having an impedance dominated by a capacitive component, the amount of charge transferred to an electrochromic device is typically controlled by utilizing current sources and current sinks.

In a known arrangement for controlling an EC device, an up/down counter is responsive to an up/down signal and a clock signal to produce a digital word representative of a desired EC charge level. Control logic is used to convert the digital word to a current source/sink programming signal suitable for causing a current source (or sink) to impart the desired charge level to the EC device.

Unfortunately, the above arrangement utilizes various components (e.g., current source and current sink transistors) having characteristics that tend to drift over time and temperature, thereby imparting more or less charge to the EC device than is otherwise indicated by the digital word produced by the up/down counter. In addition, EC devices themselves are subject to operational degradation over time and temperature. Moreover, the amount of energy required to charge an EC device is typically greater than the amount of energy required to discharge such a device. Thus, over a given period of time or temperature, an EC charge error may be accumulated such that the EC device may be significantly lighter or darker than desired.

Therefore it is seen to be desirable to provide a method and apparatus that corrects for system and device errors within an electrochromic control system such that an indicated desired EC charge level more closely comports with an actual EC charge level.

SUMMARY OF THE INVENTION

The invention comprises a method and concomitant apparatus for use in an electrochromic control system in which components causing the charging and discharging of an electrochromic device are subject to drift errors and other errors. In the case of such errors, the actual programming level and the a desired programming level as indicated by, e.g., a count value, may diverge. The invention periodically determines the actual programming level of the electrochromic device and responsively adjusts a parameter representative of the desired programming level.

Specifically, apparatus according to the invention comprises an analog to digital converter, coupled to measure a charge state of an electrochromic device without significantly altering the charge state, for producing a value representative of an actual charge state of the electrochromic device; a code converter, coupled to the analog to digital converter, for converting the actual charge state representative value into a corrected charge state representative value; a timer, coupled to the control logic, for providing a control signal indicative of the electrochromic device achieving a substantially quiescent charge state; and a value changer, responsive to the quiescent state indicative control signal and the corrected charge state representative value, for replacing a desired charge state representative value with the corrected charge state representative value.

A method according to the invention comprises the steps of measuring, during a substantially quiescent state, the voltage across an electrochromic device; relating, to a desired charge state representative value, the measured voltage level across the electrochromic device; and replacing the desired charge state representative value with a value representative of the actual charge state of the electrochromic device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
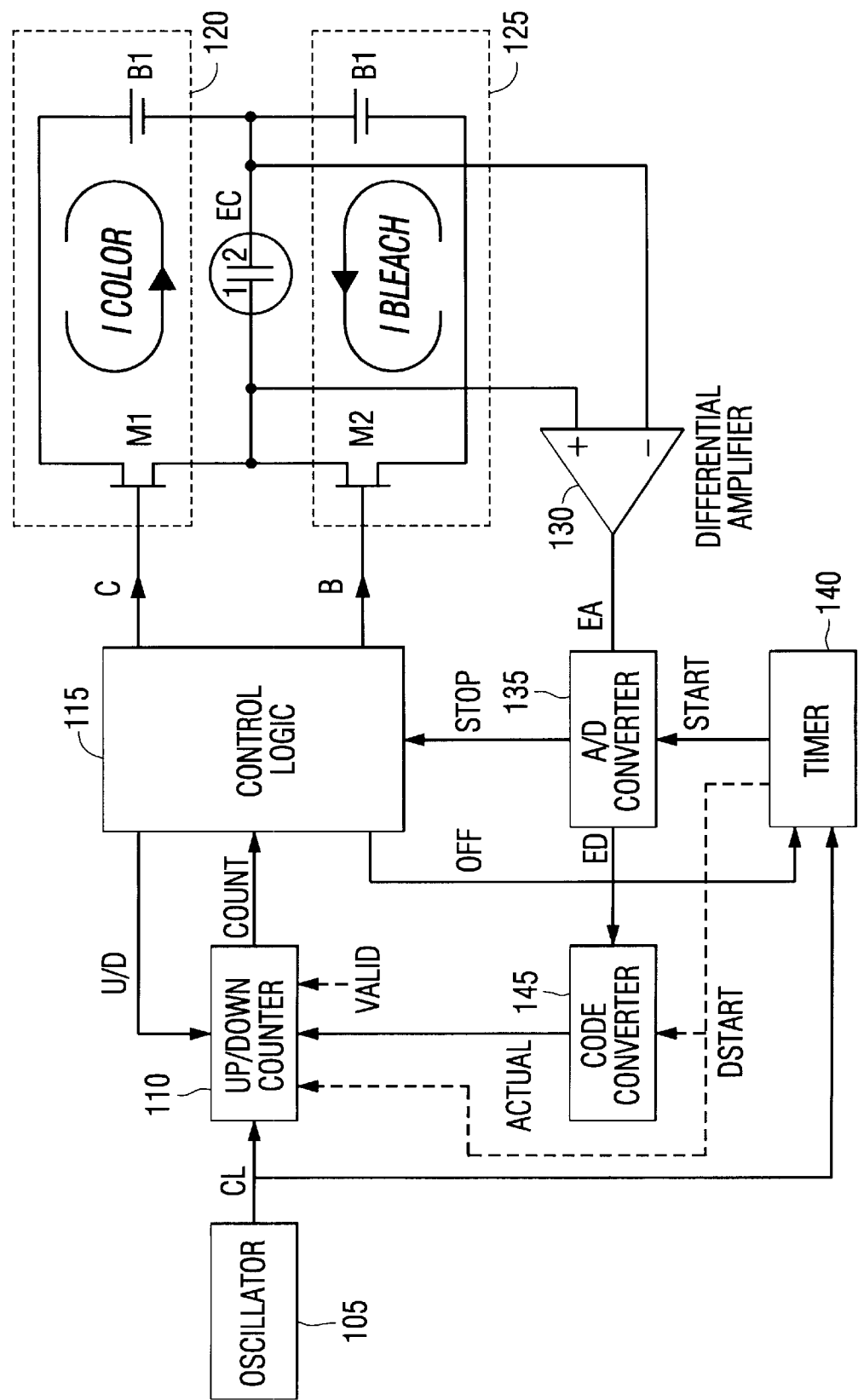
FIG. 1 depicts an electrochromic control apparatus including charge error correction apparatus according to the invention.

FIG. 1 depicts an electrochromic control apparatus 100 including charge error correction apparatus according to the invention. The electrochromic control apparatus 100 is used to control the amount of charge imparted to an electrochromic device EC. Since the electrochromic device EC may be modeled as a non-linear passive device having an impedance dominated by a capacitive component, the electrochromic device EC is depicted in FIG. 1 as a capacitor having a first terminal and second terminal.

In response to a coloring current $I_{COLOR}$ applied to the electrochromic device EC at the first terminal 1, the charge of the electrochromic device EC increases, thereby causing the device to darken. In response to a bleaching current $I_{BLEACH}$ the charge of the electrochromic device EC decreases, thereby causing the electrochromic device EC to lighten. One skilled in the art will readily recognize that the polarities of the coloring current $I_{COLOR}$ and the bleaching current $I_{BLEACH}$ may be reversed, depending on the connection and type of electrochromic device EC employed.

Electrochromic control apparatus 100 comprises an oscillator 105, an up-down counter 110, a control logic block 115, an electrochromic coloring circuit 120, an electrochromic bleaching circuit 125, a differential amplifier 130, an analog to digital (A/D) converter 135, a timer 140 and a code converter 145.

Oscillator 105, illustratively a fixed frequency crystal oscillator, produces at an output a clock signal CL that is coupled to the up/down counter 110 and the timer 140.

Up/down counter 110, illustratively an N-bit counter where N is an integer value, produces at an output a digital word COUNT indicative of a desired charge level of the electrochromic device. Specifically, up/down counter 110 produces digital word COUNT having a value between 0 and $2^N-1$, where a value of 0 is indicative of a minimal desired charge level of an electrochromic device (i.e., transparent or fully light) and a value of $2^N-1$ is indicative of a maximal desired charge level of the electrochromic device (i.e., opaque or fully dark). Thus, if N=8, up/down counter 110 produces a digital word having a value between 0 and 255 (i.e., an 8-bit word). Preferably, N is on the order of 10 or 12, such that up/down counter 110 produces a digital word having a respective value between 0 and 1023 (i.e., a 10-bit word) or 0 and 4095 (i.e., a 12-bit word).

Up/down counter 110, in response to an up/down signal U/D produced by the control logic 115, increments or decrements the charge level indicative digital word COUNT at a rate determined by the clock signal CL. The charge level indicative digital word COUNT is coupled to the control logic 115.

Control logic 115, in response to the charge level indicative digital word COUNT, produces a coloration control signal C and bleaching control signal B. Coloration control signal C is coupled to the electrochromic coloration circuit 120, while bleaching control signal B is coupled to the electrochromic bleaching circuit 125. Specifically, in response to an increase in the value of the charge level indicative digital word COUNT, control logic 115 activates, in a color mode of operation, the coloration control signal C for a period of time related to the magnitude of the increase. Similarly, in response to a decrease in the value of the charge level indicative digital word COUNT, control logic 115 activates, in a bleach mode of operation, the bleaching control signal B for a period of time related to the magnitude of decrease. After the appropriate time period has elapsed, the control logic 115 deactivates the coloration control signal C or bleaching control signal B.

The parameters of the coloration control signal C and bleaching control signal B are determined with respect to, respectively, the electrochromic coloration circuit 120 and the electrochromic bleaching circuit 125. For example, the coloration control signal C and bleaching control signal B may comprise analog signals having, e.g., voltage, current or frequency parameters that are modified in a known manner by the control logic in response to the charge level indicative digital word COUNT. Similarly, the coloration control signal C and bleaching control signal B may comprise digital signals having, e.g., pulse width or frequency parameters modified in a known manner by the control logic in response to the charge level indicative digital word COUNT.

In the exemplary embodiment 100 of FIG. 1, the electrochromic coloration circuit 120 and the electrochromic bleaching circuit 125 include Metal Oxide Silicon Field Effect Transistors (MOSFETS) arranged as respective controllable current source and current sink circuits. Thus, in the exemplary embodiment, the coloration control signal C and bleaching control signal B comprise analog signals having a voltage parameter (i.e., voltage level) that is modified in a known manner by the control logic 115 in response to the charge level indicative digital word COUNT.

Electrochromic coloration circuit 120 comprises a transistor M1, illustratively a MOSFET, and a battery B1. The transistor M1 has an input terminal coupled to a positive terminal of the battery B1 a control terminal coupled to receive the coloration control signal C. The first terminal of the electrochromic device EC is coupled to an output terminal of the transistor M1, the second terminal of the electrochromic device EC is coupled to a negative terminal of the battery B1. In response to the coloration control signal C, the transistor M1 allows current to flow along the path $I_{COLOR}$ indicated in FIG. 1, i.e., entering the first terminal of the electrochromic device EC, such that the electrochromic device EC begins to charge and, therefore, darken.

Electrochromic bleaching circuit 125 comprises a transistor M2, illustratively a MOSFET, and a battery B2. The transistor M2 has an input terminal coupled the first terminal of the electrochromic device EC, an output terminal coupled to a negative terminal of the battery B2 and a control terminal coupled to receive the bleaching control signal B. The second terminal of the electrochromic device EC is coupled to a positive terminal of the battery B2. In response to the bleaching control signal B, the transistor M2 allows current to flow along the path $I_{BLEACH}$ indicated in FIG. 1, i.e., exiting the first terminal of the electrochromic device EC, such that the electrochromic device EC begins to discharge and, therefore, lighten.

The control logic 115, after charging or discharging the electrochromic device EC in response to a respective increase or decrease in the value of the charge level indicative digital word COUNT, deactivates the respective coloration control signal C or the bleaching control signal B. After a period of time related to the impedance of the electrochromic device EC and parasitic reactances within the circuit, the electrochromic device EC reaches a state of equilibrium. That is, the charge imparted to the electrochromic device EC, and the associated coloration level, remains substantially constant.

The operation of the error compensation circuitry will now be described in detail. As previously stated, charge imparted to the electrochromic device EC may, over time, temperature and/or color and bleach cycles change with respect to the charge level indicative digital word COUNT stored in the up/down counter 110. Thus, an EC charge error may be accumulated such that the EC device may be significantly lighter or darker than desired.

To correct for discrepancies between the actual charge level of the electrochromic device EC and the desired charge level (i.e., the charge level indicative digital word COUNT stored in the up/down counter 110), the invention measures the open-circuit voltage of the electrochromic device EC at a substantially equilibrium state. The measured voltage is used to correct the charge level indicative digital word COUNT stored in the up/down counter 110.

Differential amplifier 130, illustratively a high input impedance differential amplifier such as a MOSFET input or junction field effect transistor (JFET) input operational amplifier having two input terminals and an output terminal, produces an analog output signal EA indicative of a difference in voltage potential between the first and second input terminals. Specifically, the first and second input terminals are coupled to respective first and second terminals of the electrochromic device EC such that the voltage potential between the first and second input terminal is proportional to the voltage across the electrochromic device EC. Thus, the differential amplifier output signal EA comprises an analog signal having a magnitude representative of the voltage potential across the electrochromic device EC. The differential amplifier output signal EA is coupled to analog to digital converter 135.

Analog to digital (A/D) converter 135, illustratively a standard successive approximation or delta-sigma A/D converter, converts the differential amplifier output signal EA into a digital word ED in a known manner. The digital word ED is coupled to the code converter 145.

Timer 140, illustratively a resettable counter, is enabled to begin counting when the charge/discharge status indicator OFF provided by the control logic 115 indicates that the clear and bleach currents are both inactive. Timer 140 counts at a rate determined by the clock input CL from the oscillator 105. A timer output signal START indicates that a predetermined count value has been reached (i.e., a predetermined amount of time has elapsed). The predetermined count value (or amount of time) is associated with the amount of time required for the electrochromic device EC to reach a substantially quiescent charge state after the removal of the color or bleach current. Thus, the timer output signal START indicates that the electrochromic device EC is in a substantially quiescent charge state and that voltage measurements of the EC device will not include voltage due to the coloring current $I^{COLOR}$ or the bleaching current $I_{BLEACH}$ causing a voltage drop across resistive components within the electrochromic device EC.

Code converter 145, illustratively a lookup table, is used to relate the voltage across the electrochromic device EC as indicated by the A/D converter 135 to the charge imparted to the device (i.e., the coloration level). This is possible because the relationship between the voltage across the electrochromic device EC and the charge imparted to the device is a well known characteristic of the device that is typically provided by the device manufacturer. Thus, for a range of open circuit voltage levels measured by the A/D converter 135, there exists a linearly and/or non-linearly related range of charge levels that is stored in the lookup table. The code converter 145 produces at an output a digital word ACTUAL indicative of the actual charge level of the electrochromic device EC. The charge level indicative digital word ACTUAL is coupled to the up/down counter 110.

Up/down counter 110 includes value changing circuitry that, in response to a valid charge level indicative digital word ACTUAL, replaces the charge level indicative digital word COUNT with the actual charge level indicative digital word ACTUAL. In this manner, errors reflected by the differences between the actual charge level indicative digital word ACTUAL and the charge level indicative digital word COUNT are removed. It is important to note that a valid charge level indicative digital word ACTUAL reflects a code-converted measurement of the open-circuit voltage of the electrochromic device EC at a substantially equilibrium state.

The value changing circuitry comprises, e.g., a count load input that receives the valid charge level indicative digital word ACTUAL and, in response to a "reset" or "jam" signal, replaces the existing count value with the received count value. The reset or jam signal may be derived in a known manner from, e.g., noting a change of state of the received count value or in response to a "valid data" flag produced by, e.g., the code converter 145.

In one embodiment of the invention, the A/D converter 135 is coupled to the timer 140 and receives the timer output signal START. In this embodiment, the A/D converter 135 only performs an analog to digital conversion if the timer output signal START indicates that the electrochromic device EC is presently at a substantially equilibrium state. It will be known to those skilled in the art that a small delay may be required to compensate for delays inherent in, e.g., the differential amplifier 130. Thus, the output signal ED of the A/D converter will always be based on a measurement of the electrochromic device EC at a substantially equilibrium state.

In one embodiment of the invention, the timer 140 produces a delayed start signal DSTART that is coupled to the code converter 145. In this embodiment, the code converter 145 will ignore the output signal ED of the A/D converter 135 unless the delayed start signal DSTART indicates that a valid measurement has been made. The delayed start signal DSTART comprises a delayed version of the timer output signal START. The amount of delay is selected to allow two full conversion cycles of the analog to digital converter 135. In this manner, the A/D converter may be operated continuously (i.e., not enabled by the START signal), while the code converter 145 is only enabled if the resulting code converted output digital word ACTUAL will be valid.

In one embodiment of the invention, the timer 140 produces a delayed start signal DSTART that is coupled to the up/down counter 110. In this embodiment, the up/down counter 110 will ignore the output of the code converter 145 unless the delayed start signal DSTART indicates that a valid measurement has been made. In this manner, the A/D converter 135 and the code converter 145 may be operated continuously, while the up/down counter 110 is only modified if the resulting code converted output digital word ACTUAL will be valid. It will be known to those skilled in the art that additional delay may be added to the delayed start signal DSTART to compensate for, e.g., propagation delays within the code converter 145.

Figure 2:
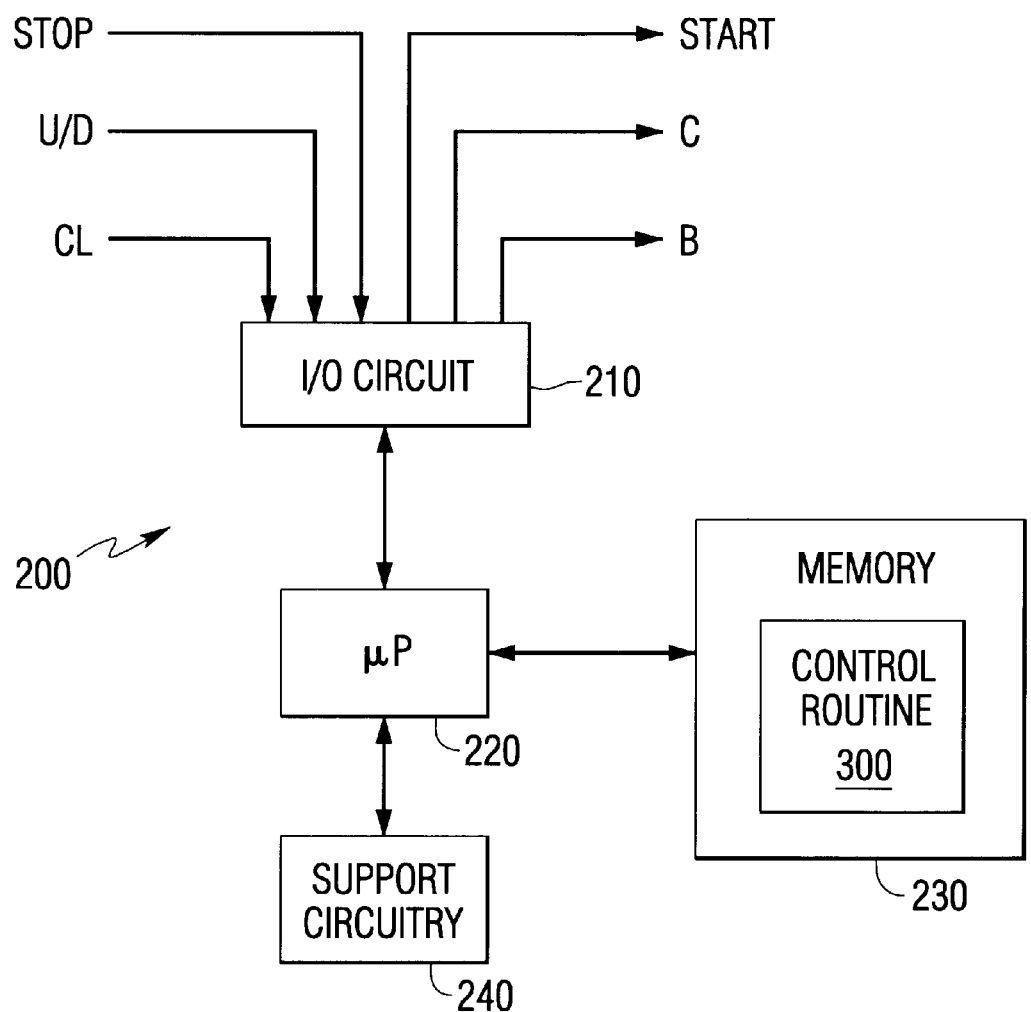
FIG. 2 depicts an alternate embodiment of a portion of the electrochromic control apparatus of FIG. 1.

FIG. 2 depicts an alternate embodiment of a portion of the electrochromic control apparatus 100 of FIG. 1. Specifically, FIG. 2 depicts an EC control apparatus 200 that may be used in place of the up/down counter 110, control logic 115, timer 140 and code converter 145 of the electrochromic control apparatus 100 of FIG. 1.

The EC control apparatus 200 comprises a microprocessor 220 as well as memory 230 for storing an EC control routine 300. The microprocessor 220 cooperates with conventional support circuitry 240 such as power supplies, clock circuits, cache memory and the like as well as circuits that assist in executing the software routines. As such, it is contemplated that some of the process steps discussed herein as software processes may be implemented within hardware, e.g., as circuitry that cooperates with the microprocessor 220 to perform various steps. The EC control apparatus 200 also contains input/output circuitry 210 that forms an interface between the oscillator 105, the A/D converter 135, the electrochromic coloring circuit 120 and the electrochromic bleaching circuit 125 of FIG. 1. Although the EC control apparatus 200 is depicted as a general purpose computer that is programmed to perform EC control functions in accordance with the present invention, the invention can be implemented in hardware as an application specific integrated circuit (ASIC). As such, the process steps described herein are intended to be broadly interpreted as being equivalently performed by software, hardware, or a combination thereof.

The EC control apparatus 200 of the present invention executes an EC control routine 300 that implements the control functions described above with respect to FIG. 1. The EC control routine 300 will now be described with respect to FIG. 3.

Figure 3:
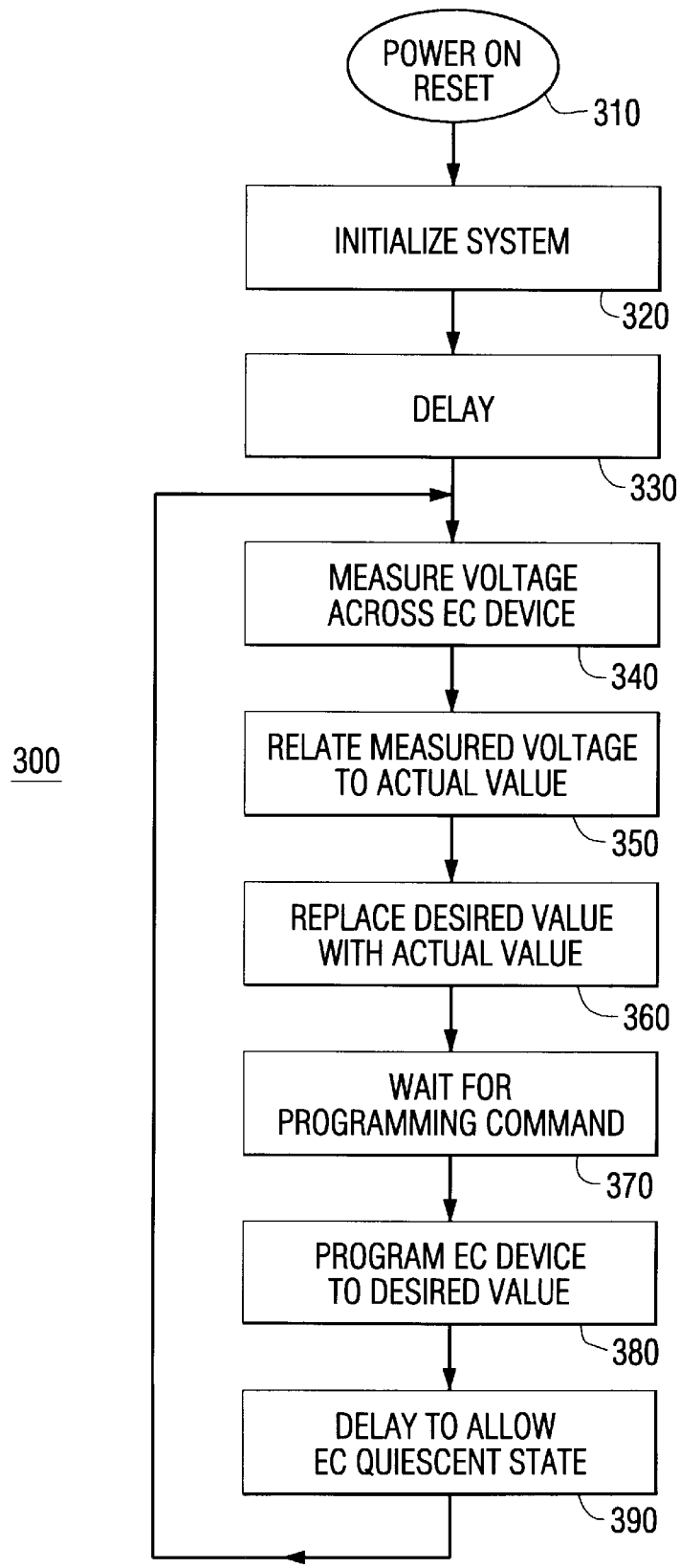
FIG. 3 depicts a flow diagram of an electrochromic device control routine according to the invention.

FIG. 3 depicts a flow diagram of an electrochromic device control routine 300 according to the invention. The control routine 300 is entered at step 310 in response to, e.g., a power-on reset, and proceeds to step 320, where the system is initialized. The routine then proceeds to step 330, where the routine 300 is delayed for a period of time calculated to allow the electrochromic device being controlled to settle to a substantially quiescent state. The routine 300 then proceeds to step 340.

At step 340, the voltage across the electrochromic device is measured. The routine 300 then proceeds to step 350, where the measured voltage is related to an actual programming value. That is, the actual charge level of the EC device is related to, e.g., a corresponding count value that should be stored within up/down counter to produce such a charge level. The value presently stored in the up/down counter (or other memory location) represents a desired programming value.

The routine 300 then proceeds to step 360, where the desired programming value, if different from the actual programming value, is replaced by the actual programming value determined at step 350. In this manner the programming value stored by up down counter 110 is appropriately related to the actual DC voltage or DC charge level of the EC device. The routine 300 then proceeds to step 370, where it waits for a programming command.

Upon receiving a programming command (e.g., increment or decrement the counter), the routine 300 proceeds to step 380 where the electrochromic device is programmed to a desired value as indicated by the received programming command. The routine 300 then proceeds to step 390, where it is delayed by an amount calculated to allow the electrochromic device being controlled to enter a substantially quiescent state. The routine 300 then proceeds to repeat steps 340 through 390.

The above-described invention is particularly well suited for battery powered electrochromic device applications, such for controlling the charge level of electrochromic coatings on lenses in, e.g., a pair of eyeglasses (i.e., sunglasses). The invention also finds applicability in areas such as automotive, architectural and aircraft glass and/or glazing, advertising displays and the like.

Although various embodiments which incorporate the teachings of the present invention have been shown and described in detail herein, those skilled in the art can readily devise many other varied embodiments that still incorporate these teachings.

What is claimed is:

1. In a system for controlling a charge state of an electrochromic device by selectively imparting, via control logic, one of a positive charge and a negative charge to said electrochromic device in response to changes in a value representative of a desired charge state, apparatus for correcting said desired charge state representative value comprising:

an analog to digital converter, coupled to measure said charge state of said electrochromic device without significantly altering said charge state, for producing a value representative of an actual charge state of said electrochromic device;

a code converter, coupled to said analog to digital converter, for converting said actual charge state representative value into a corrected charge state representative value;

a timer, coupled to said control logic, for providing a control signal indicative of said electrochromic device achieving a substantially quiescent charge state; and a value changer, responsive to said quiescent state indicative control signal and said corrected charge state representative value, for replacing said desired charge state representative value with said corrected charge state representative value.

2. The apparatus of claim 1, further comprising an up/down counter, coupled to said control logic and said code converter, for storing said desired charge state representative value;

said value changer comprising reset circuitry within said up/down counter.

3. The apparatus of claim 1, wherein said code converter comprises a look up table.

4. The apparatus of claim 1, wherein:

said analog to digital converter is coupled to said timer to provide said actual charge state representative value only when said electrochromic device has achieved a substantially quiescent charge state.

5. The apparatus of claim 1, wherein:

said code converter is coupled to said timer to provide said corrected charge state representative value only when said electrochromic device has achieved a substantially quiescent charge state.

6. The apparatus of claim 2, wherein:

said reset circuitry is coupled to said timer to replace said desired charge state representative value with said corrected charge state representative value only when said electrochromic device has achieved a substantially quiescent charge state.

7. The apparatus of claim 1, wherein:

said apparatus is part of a eyeglasses system; and said electrochromic device comprises a lens portion of said eyeglasses.

8. Apparatus controlling a charge level of an electrochromic device, comprising:

a charge source, for imparting a charge to said electrochromic device;

a memory, for storing a value indicative of a desired charge level;

a controller, coupled to said memory and said charge source, for adapting said imparted charge in response to said desired charge level; and a voltage measurement unit, coupled to said electrochromic device, for measuring a voltage level of said electrochromic device and producing therefrom a voltage level indicative signal; wherein said controller, in response to said voltage level indicative signal, calculates an actual charge level of said electrochromic device; and if said actual charge level is different than said desired charge level stored in said memory, said controller causes said desired charge level stored in said memory to be replaced by a value indicative of said actual charge level.

9. The apparatus of claim 8, wherein:

said memory comprises an up/down counter;

said controller comprises control logic and a code converter, and said voltage measurement unit comprises an analog to digital (A/D) converter.

10. The apparatus of claim 9, wherein:

said code converter, in response to a output signal from said A/D converter, generates an output code indicative of a value corresponding to said actual charge level of said electrochromic device; and said up/down counter, in response to said output code, replaces a present count value with said output code value.

11. The apparatus of claim 10, wherein:

said A/D converter is responsive to an output signal from a timer, said timer output signal indicative of said electrochromic device being in a substantially quiescent charge state.

12. The apparatus of claim 1, wherein:

said apparatus is part of an eyeglasses system; and said electrochromic device comprises a lens portion of said eyeglasses.

13. In a system for controlling a charge state of an electrochromic device by selectively imparting, via control logic, one of a positive charge and a negative charge to said electrochromic device in response to changes in a value representative of a desired charge state, a method for correcting said desired charge state representative value comprising the steps of:

measuring, during a substantially quiescent state, the voltage across the electrochromic device;

relating, to said desired charge state representative value, the measured voltage level across the electrochromic device; and replacing said desired charge state representative value with a value representative of the actual charge state of the electrochromic device.

14. The method of claim 13, wherein:

said electrochromic device comprises a lens portion of a pair of eyeglasses.

\* \* \* \* \*